United States Patent [19]

May

[11] 4,300,938

[45] Nov. 17, 1981

[54] GLASS RIBBON ATTENUATING APPARATUS

[75] Inventor: Earl L. May, Irwin, Pa.

[73] Assignee: PPG Industries, Inc., Pittsburgh, Pa.

[21] Appl. No.: 155,872

[22] Filed: Jun. 2, 1980

[51] Int. Cl.³ ............................................ C03B 18/06
[52] U.S. Cl. .................................... 65/182.4; 65/201;
65/356
[58] Field of Search ................. 65/182.4, 200, 201,
65/356, 91, 182.1

[56]  References Cited
U.S. PATENT DOCUMENTS

| | | | |
|---|---|---|---|
| 2,007,782 | 7/1935 | Wildermuth | 65/201 X |
| 3,107,162 | 10/1963 | Nyquist et al. | 65/201 X |
| 3,427,142 | 2/1969 | De Lajarte | 65/182.4 X |
| 3,450,518 | 6/1969 | Itakura et al. | 65/182.4 |
| 3,533,772 | 10/1970 | Itakura et al. | 65/182.4 |
| 3,653,869 | 4/1972 | Biagini | 65/182.3 |
| 3,664,820 | 5/1972 | Montgomery | 65/182.4 X |
| 3,709,673 | 1/1973 | Bishop | 65/182.4 |
| 3,713,797 | 1/1973 | Lawrenson | 65/182.4 X |
| 3,929,444 | 12/1975 | May et al. | 65/182.4 |
| 3,998,616 | 12/1976 | Farabaugh | 65/182.4 X |
| 4,255,180 | 3/1981 | Wolfe | 65/182.1 |

FOREIGN PATENT DOCUMENTS 48-20761 6/1973 Japan ........................... 65/182.4
218377 4/1970 U.S.S.R.

Primary Examiner—Richard V. Fisher
Attorney, Agent, or Firm—Lee Patch; Donald Carl Lepiane

[57]  ABSTRACT

Apparatus for engaging the marginal edge portion of a ribbon of molten glass is mounted to the exterior sidewall of a float chamber below the sidewall opening and above the floor level. The vertical arcuate movement of the elongated barrel is controlled by a pair of screw jack assemblies symmetrically positioned on opposite sides of the longitudinal centerline of the barrel, themselves controlled alternatively by a motor or manual driving force. The motor may be back-driven by the manual control to provide both remote and manual fine tune capabilities. The elongated barrel includes an outer tubular member and an inner rotatable tubular drive member which is supported therein by a heat resistant toroidal bushing near its insertable end and by a precision bearing near its drive end.

29 Claims, 9 Drawing Figures

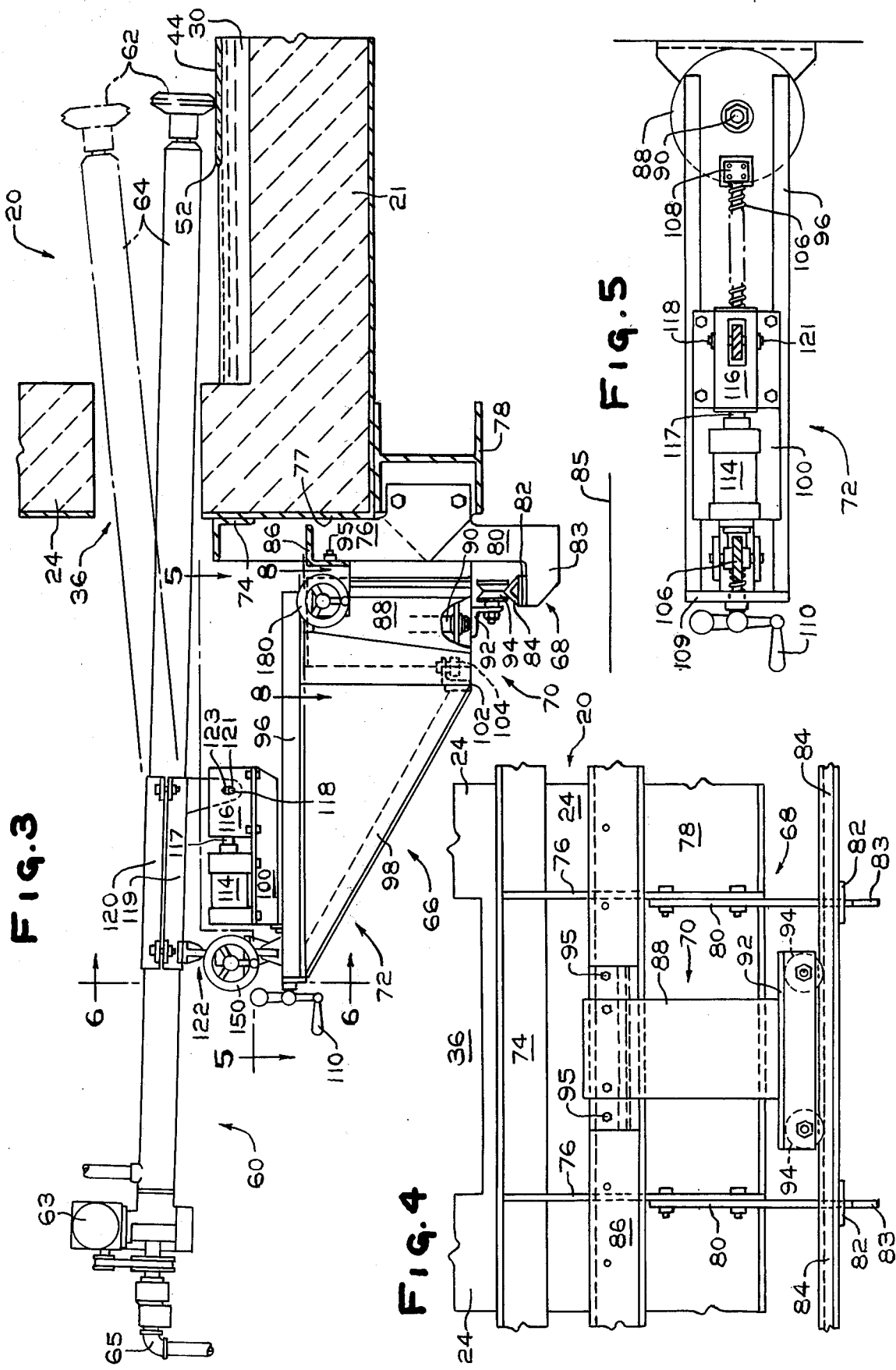

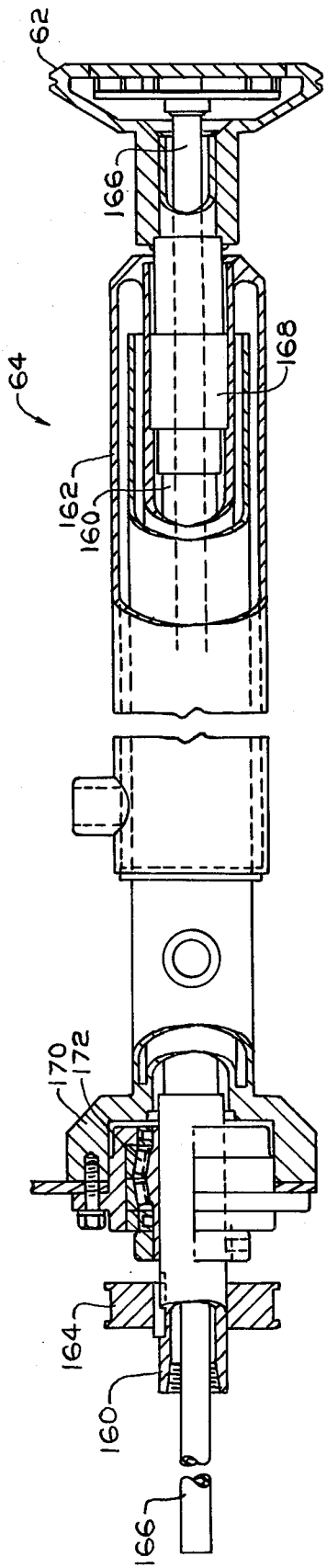
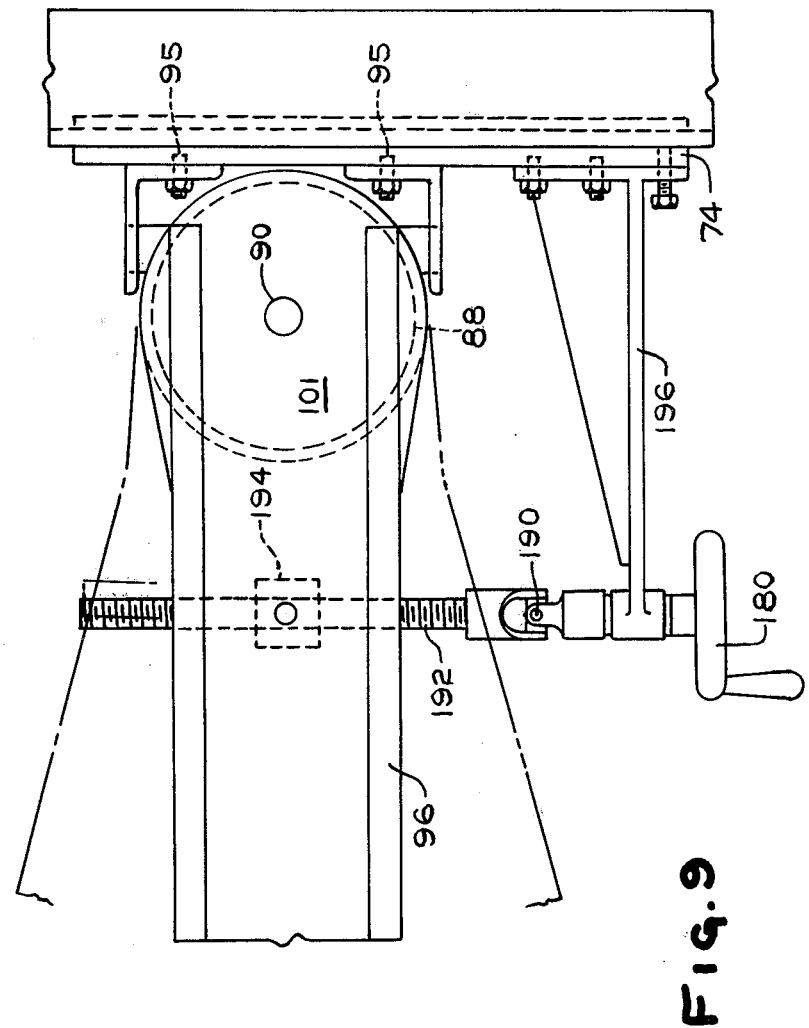
Fig. 7
Fig. 9

GLASS RIBBON ATTENUATING APPARATUS

FIELD OF THE INVENTION

This invention relates to an apparatus for applying forces to the marginal edges of a ribbon of molten glass which is supported upon and moving on a bath of molten metal.

DESCRIPTION OF THE TECHNICAL PROBLEM

In the practice of manufacturing flat glass, molten glass is moved through a delivery channel onto a molten bath of tin contained in a chamber to form a ribbon of glass which is pulled along the bath and gradually cooled until it becomes dimensionally stable. Thereafter the glass ribbon is removed from the bath and moves into a lehr for annealing.

When supported on molten tin, the molten glass has an equilibrium thickness of about 0.271 inch (6.87 millimeters). Glass of less than equilibrium thickness can be obtained by pulling the glass with a force downstream of the delivery channel near the lehr (often called lehr force) which stretches or attenuates the glass and causes it to move faster than when glass of equilibrium thickness is produced. However, the glass ribbon not only becomes thinner, but also becomes narrower unless opposed marginal edges of the ribbon are restrained, e.g. by edge roll machines.

In general, edge roll machines include a support mounted outside of the chamber sidewall for supporting a fluid cooled barrel which extends through an opening in the sidewall. An attenuating wheel mounted on the barrel engages the upper surface of the ribbon. The attenuating wheel is driven from without the chamber to rotate about the longitudinal axis of the barrel, which in turn is positioned at a horizontal angle downstream of a line normal to the ribbon movement path. In this manner, opposed edge roll machines apply longitudinal and transverse components of force to the ribbon to maintain the ribbon at a desired width and thickness.

U.S. Pat. Nos. 3,450,518 and 3,533,772 to Itakura et al, 3,709,673 to Bishop, 3,713,797 to Lawrenson, and 3,998,616 to Farabaugh each teach an edge roll machine having a barrel which is supported outside the chamber's sidewall by a floor-mounted cart or moveable stand. These machines are used to attenuate the glass ribbon but have limitations associated therewith. For example, in order to provide stability to the barrel while the edge roll machine is operating, the floor-mounted carts or stands are generally quite large and heavy, thus occupying considerable sidewall space and limiting access thereto. Floor mounted carts or stands may interfere with supply lines and hoses which rest on the floor outside the sidewall of the chamber. Further, the floor mounted carts or stands generally are spaced a distance from the sidewall, thus requiring a barrel of greater length and complexity than ideal.

U.S. Pat. No. 3,929,444 to May et al teaches an edge roll machine having a barrel support on rails running parallel to the sidewall above the elevation of the sidewall opening. This machine overcomes some of the limitations associated with floor-mounted supports but has other limitations. Because the barrel is supported above the elevation of the sidewall openings, the machine components are subjected to greater amounts of heat and hostile gases when the chamber sidewall is temporarily opened. Further, the support rails are spaced a distance from the sidewall, with the barrel pivoting horizontally about a point directly therebelow. Because the sidewall openings have a fixed length, the amount of change in horizontal barrel angle available is limited by the distance between the sidewall and the horizontal pivot point. If greater barrel angle is required, the attenuating wheel needs to be disengaged from the ribbon while the carriage is repositioned along the support rails, a time-consuming and undesirable condition. Further it has become desirable to insert heating elements into the chamber above the glass ribbon, preferably inserted through the chamber sidewall above the elevation of the sidewall openings. As a result, the support rail mounting technique may interfere with access to the overhead heating elements. Further, on occasion during production it becomes necessary for workmen to extend long tools through the sidewall to manually manipulate the edge of the glass ribbon, during which time it is desirable to elevate the attenuating wheel as high as possible from the glass surface to provide access thereunder. Due to the overhead mounting technique employed, it is inconvenient to raise the attenuating wheel any considerable distance above the surface of the glass, thus making it advantageous to have an edge roll machine which avoids the above-discussed technical problems.

The barrel generally utilized in edge roll machines consists of an inner tubular member rotating within an outer tubular member, with fluid cooling facilities provided within. U.S. Pat. No. 3,709,673 to Bishop teaches such a barrel which uses a toroidal bushing made of lubricious, heat resistant material positioned between the inner and outer tubular members near the attenuating wheel to maintain the tubular members in coaxial alignment. The inner tubular member is generally supported and aligned with the toroidal bushing adjacent its drive end beyond the end of the outer tubular member by means of a shimmed pillow block bearing. If the inner tubular member is not precisely aligned with the toroidal bushing, the inner member will not rotate freely and smoothly, producing undesirable perturbations in the glass ribbon. Further, undue wear will occur in the toroidal bushing, necessitating expensive and time-consuming replacement procedures. It would be advantageous to employ a barrel which more certainly assures unrestricted rotation of the inner tubular member while avoiding undue torodial bushing wear.

SUMMARY OF THE INVENTION

An apparatus is provided for making flat glass by which the marginal edge portion of a ribbon of glass which is supported upon a pool of molten metal contained within a chamber having sidewalls and openings therein is controlled to establish and maintain a desired width and thickness. The apparatus includes support means mounted on the exterior of the sidewall below the elevation of the sidewall opening in such a manner to isolate the support means from floor vibrations. A platform is pivotally mounted to the support means to provide horizontal arcuate motion and extends outward from the sidewall between the level of the sidewall opening and floor level. One end of an elongated member, e.g., a fluid cooled barrel, is movably mounted to the platform, the other end of which supports a force applying means, e.g., an attenuating wheel. The barrel is mounted upon the platform to provide longitudinal motion thereof generally toward and away from the sidewall, as well as pivotal motion through a vertical arcuate path. In this way, the position of the attenuating wheel can be adjusted in all spatial directions. The present invention provides a compact support structure which provides increased sidewall access while not interfering with overhead heating elements or with supply lines and hoses on the floor. Further, the invention removes critical machine components from communication with undesired heat and hostile gas. By mounting directly to the sidewall, the invention provides numerous advantages, including a constant reference point for precise barrel angle control and repeatability, as well as permitting the use of shorter and less complex barrels. Further, the horizontal pivot point of the barrel is positioned in close proximity to the sidewall, providing for greater possible horizontal barrel angles for a fixed length sidewall opening.

The present invention also relates to improvements in barrel position control, particularly in controlling the vertical arcuate movement of the barrel in relation to the platform to control engagement of the attenuating wheel with the glass ribbon. A fulcrum is provided for the barrel near its central portion, and a pair of vertically disposed screw jack assemblies are spaced from the fulcrum point to pivotally connect the barrel to the platform. The screw jack assemblies are symmetrically positioned on opposite sides of the longitudinal axis of the barrel, and operate together to pivot the barrel in a vertical arcuate path about the fulcrum point. The screw jack assemblies share a common control shaft which is operated on at one end by a motor drive and at the other end by a manual drive, thus permitting remote control capabilities as well as manual fine tune adjustment.

The present invention also relates to an improved barrel assembly comprising a rotatable inner tubular member and a stationary outer tubular member. The inner tubular member supports the attenuating wheel at a first end and is adapted at its second end to be rotatably driven within the outer tubular member. The inner tubular member is supported within the outer tubular member near the first end by a toroidal bushing secured therebetween and near the second end by a bearing which is secured in position between the inner member and a bearing housing attached to the end of the outer tubular member, to assure precise alignment of the inner tubular member with the toroidal bushing.

BRIEF DESCRIPTION OF THE DRAWINGS

FIG. 3 is an elevated side view taken along lines 3—3 of FIG. 2 with portions removed for clarity illustrating alternative vertical positioning.

FIG. 4 is an elevated view taken along lines 4—4 of FIG. 2 with upper portions removed for clarity.

FIG. 5 is a plan view taken along lines 5—5 of FIG. 3.

FIG. 7 is a fragmented sectional view taken along lines 7—7 of FIG. 2 with portions removed for clarity.

FIG. 9 is a sectional plan view similar to FIG. 8 illustrating an alternate embodiment of the present invention.

DETAILED DESCRIPTION OF THE INVENTION

Figure 1:
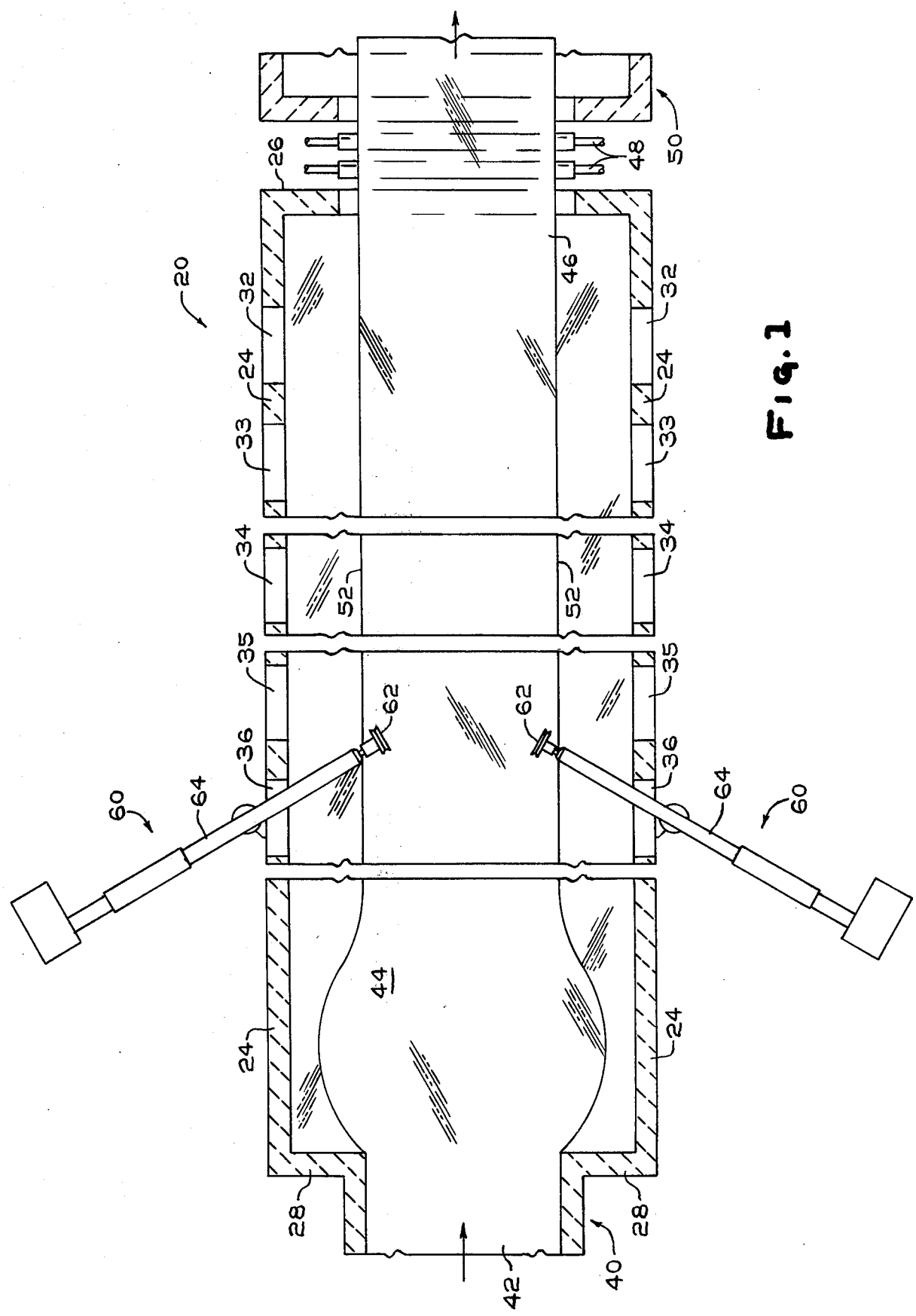
FIG. 1 is a fragmented sectional plan view of a float chamber having portions removed for clarity illustrating a pair of edge roll machines incorporating features of the present invention.

Referring to FIG. 1, there is shown a section of the interior of a float chamber 20 of the type known in the flat glass manufacturing art. The chamber 20 includes a refractory bottom 21 (see FIG. 3), a refractory roof (not shown), refractory sidewalls 24, a refractory exit lip 26, and refractory backwalls 28, to form a container for containing a pool of supporting molten metal 30, e.g., tin or tin alloy. The chamber 20 is provided with a plurality of opposing sidewall openings 32-36 therein for providing access to the interior of the float chamber 20. The openings are conveniently sealed to prevent the escape of a protective atmosphere which prevents oxidation of the molten metal 30.

The chamber 20 is connected to a delivery channel 40 through which molten glass 42 is moved at a controlled rate in any convenient manner onto the pool of molten metal 30 to form a body of hot glass 44 thereon. As the body of hot glass 44 moves downstream from the delivery channel 40 in the direction of the arrow, the body of hot glass 44 undergoes attenuation and cooling to form a dimensionally stable glass ribbon 46.

The glass ribbon 46 is moved over exit lip 26 of chamber 20 and conveyed by rollers 48 into an annealing lehr 50. The forming chamber described above is not limiting to the present invention, but is included to illustrate an environment in which the present invention may be used.

"Attenuation" as the term is used herein is defined as a controlled reduction in glass thickness by application of longitudinal and transverse forces to the marginal edges of the body of hot glass 44 as it moves downstream through chamber 20.

A pair of edge roll machines 60 incorporating features of the present invention are illustrated in FIG. 1, including force applying facilities 62, e.g., attenuating wheels, securely mounted on one end of an elongated member 64, e.g., a barrel, which barrel 64 extends through sidewall opening 36 of sidewall 24. The attenuating wheel 62 engages the top surface of the marginal edge portion 52 of the body of hot glass 44 to apply forces thereto to attenuate the ribbon. Barrel 64 generally extends into chamber 20 in a direction which is downstream of line normal to the direction of glass movement, resulting in longitudinal and transverse components of force being applied to the body of hot glass 44 by attenuating wheel 62. The longitudinal component of force tends to accelerate the body of hot glass 44 in the direction of the arrow, while the transverse component of the force tends to maintain or increase the width of the body of hot glass 44.

Figure 2:
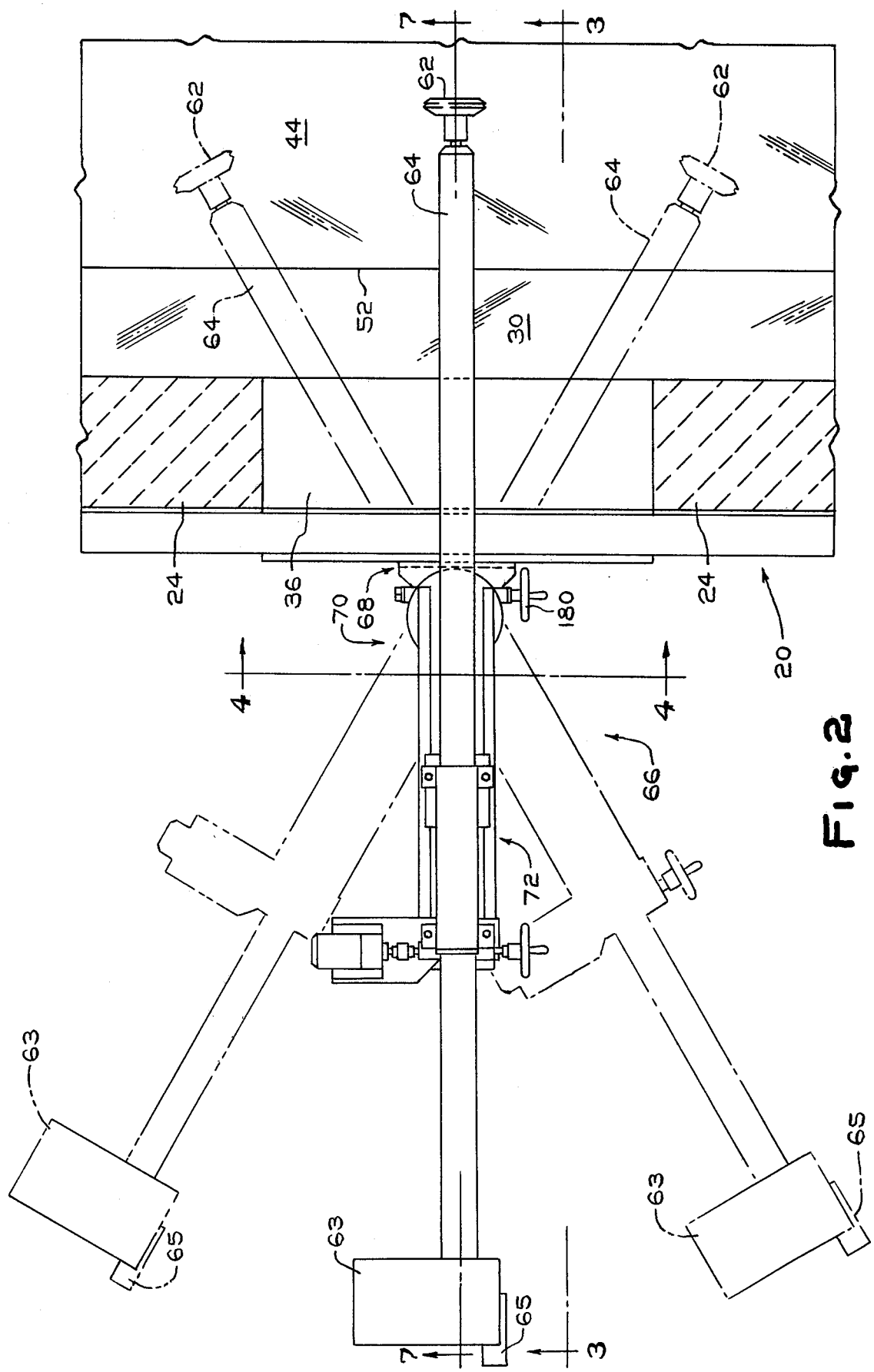
FIG. 2 is a partially schematic plan view of an edge roll machine incorporating features of the present invention illustrating alternative horizontal positioning.

Barrel 64 may be a fluid cooled barrel as taught in U.S. Pat. No. 3,709,673, which teachings are herein incorporated by reference, or it may incorporate features of the present invention to be discussed hereinafter. As shown in FIGS. 2 and 3, the exterior end of barrel 64 is advantageously mounted outside chamber 20 to a support facility 66 which extends from the exterior of sidewall 24 above the floor level and below the elevation of sidewall opening 36 as clearly shown in FIG. 3. A variable speed motor 63 and a fluid supply coupling 65 are secured to the exterior end of barrel 64 in any convenient manner. Variable speed motor 63 is preferably a synchronous motor accurately controllable in a range between 10 Hertz and 120 Hertz and may be of the type sold by the Electric Indicator Company as Model No. 58HNNBD-3365-6E9 alternatively, by Allis-Chalmers Company as a ⅓ H.P. Synduction Motor.

Support facility 66 in general has three principal components; a support bracket assembly 68, a trunnion assembly 70, and a platform assembly 72, each of which will now be described in detail, beginning with support bracket assembly 68. As best shown in FIGS. 3 and 4, an elongated angle iron 74 is horizontally secured along the exterior of sidewall 24, below the lower edge of sidewall openings 32 to 36. A pair of spaced vertically oriented support plates 76 are positioned symmetrically about the vertical centerline of sidewall openings 32 to 36, e.g., opening 36 as shown in FIGS. 3 and 4 and rigidly secured, e.g., welded, to the metal casing 77 of the exterior face of sidewall 24, with their lower portions extending below and under the bottom edge of chamber 20 and secured to I-beam 78, which acts as a base for chamber 20 as shown in FIG. 3. A second pair of vertically oriented support plates 80 are rigidly secured, e.g., bolted, to the lower portions of support plates 76 and extended therebelow. Blocks 82 are secured to an extending portion 83 of plates 80, and support a guiderail 84, which runs horizontally parallel to sidewall 24 above the floor 85. An elongated angle iron 86 is horizontally secured to plates 76 to support the trunnion assembly 70.

Trunnion assembly 70, as best shown in FIGS. 3 and 4, has a stationary outer drum 88, within which a pivot shaft 90 (shown in FIGS. 3 and 5) is centrally mounted. The pivot shaft 90 is pivotally mounted near its top and bottom portions by bearings (not shown) to permit its free rotation within outer drum 88. Depending downward from the bottom of outer drum 88 is an angle iron 92, which rotatably supports a pair of wheels 94 which ride in guide rail 84.

The upper portion of the outer drum 88 of the trunnion assembly 70, as shown in FIGS. 3 and 4, is conveniently secured, e.g., by bolts 95 to angle iron 86 of support bracket assembly 68. Thus trunnion assembly 70 is firmly secured in position while the edge roll machine 60 is operated, but may quickly be repositioned by unbolting the bolts 95 and rolling the assembly 70 along guiderail 84 to a more advantageous position, where it may be resecured in another pair of incrementally spaced alignable holes of angle iron 86.

Figure 8:
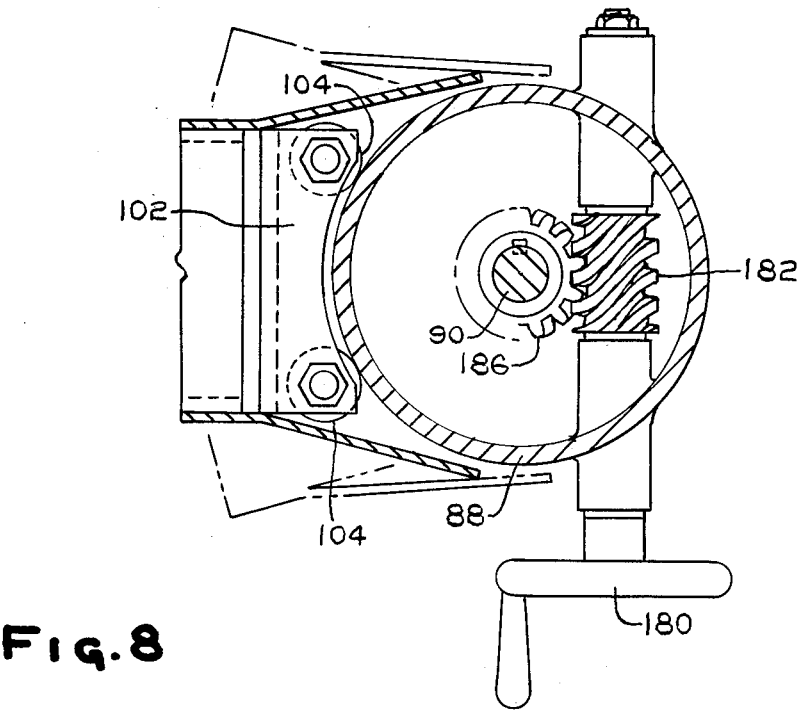
FIG. 8 is a sectional plan view taken along lines 8—8 of FIG. 3.

Platform assembly 72, best shown in FIGS. 2, 3, and 5, includes a platform 96, a platform brace 98 (shown only in FIG. 3), a base 100 slidably mounted on platform 96 and barrel control mechanisms to be discussed more fully hereinafter. End portion 101 of platform 96 overlays the top of the outer drum 88 to receive the end of the pivot shaft 90 and is secured thereto (see FIG. 9). Platform brace 98 is secured to the extended end of platform 96 and projects at a downward angle therefrom toward the bottom portion of drum 88. Referring now to FIGS. 3, 8 and 9, roller support plate 102 is secured to the platform brace 98 and has a pair of rollers 104 affixed thereto to roll along drum 88 when the pivot shaft 90 rotates within outer drum 88 thus rotating platform 96 and platform brace 98 through a horizontal arcuate path.

As can now be appreciated, barrel 64 will move in horizontal arcuate motion when pivot shaft 90 rotates in any convenient manner within outer drum 88. For example and referring to FIGS. 2, 3, and 8, a handwheel 180 rigidly secured to a worm shaft 182 which extends into outer drum 88 and engages a worm gear 186 of pivot shaft 90. In this manner pivot shaft 90 rotates according to the rotation of handwheel 180 to pivot barrel 64 in horizontal arcuate motion.

Alternatively, with reference to FIG. 9, handwheel 180 is connected by universal joint 190 to a threaded shaft 192 which extends below platform 96 into an internally threaded pivot block 194 attached thereto. Handwheel 180 is conveniently connected to angle iron 74 by bracket 196 for support, and pivots barrel 64 about pivot shaft 90 when rotated.

Base 100 is conveniently slidably mounted within platform 96 to provide reciprocal linear motion along platform 96 toward and away from pivot shaft 90, i.e., toward and away from the sidewall of the chamber 20. For example, as best shown in FIG. 5, an elongated threaded shaft 106 having one end connected within a bearing block 108 extends along the longitudinal centerline of platform 96 below base 100 through wall 109 to crank 110. As crank 110 is rotated, the threads of threaded shaft 106 engage and translate base 100 along platform 96.

With reference to FIG. 3, the barrel 64 has an outer portion mounted between clampbottom 119 and clamptop 120. One end of clampbottom 119 is connected to a convenient nip-unnip assembly 116 to provide a fulcrum point 121 for vertical arcuate motion of the barrel 64 while the other end of barrel 64 is connected to an elevation mechanism 122. Elevation mechanism 122 is mounted on base 100 and controls the vertical pivotal movement of barrel 64. Air cylinder 114, also mounted on the base 100, is operatively connected to the nip-unnip assembly 116 by rod 117 to provide for rapidly lifting the barrel 64 and attenuating wheel 62 to disengage the edge roll machine 60 from the glass. As used herein, "nip" is defined as contact between attenuating wheel 62 and the body of hot glass 44, and "unnip" is defined as the absence of such contact. Referring to FIG. 3, air cylinder 114 is activated to extend rod 117 which raises pin 118 in groove 123 to raise the barrel 64 to disengage attenuating wheel 62 from the body of hot glass 44.

Figure 6:
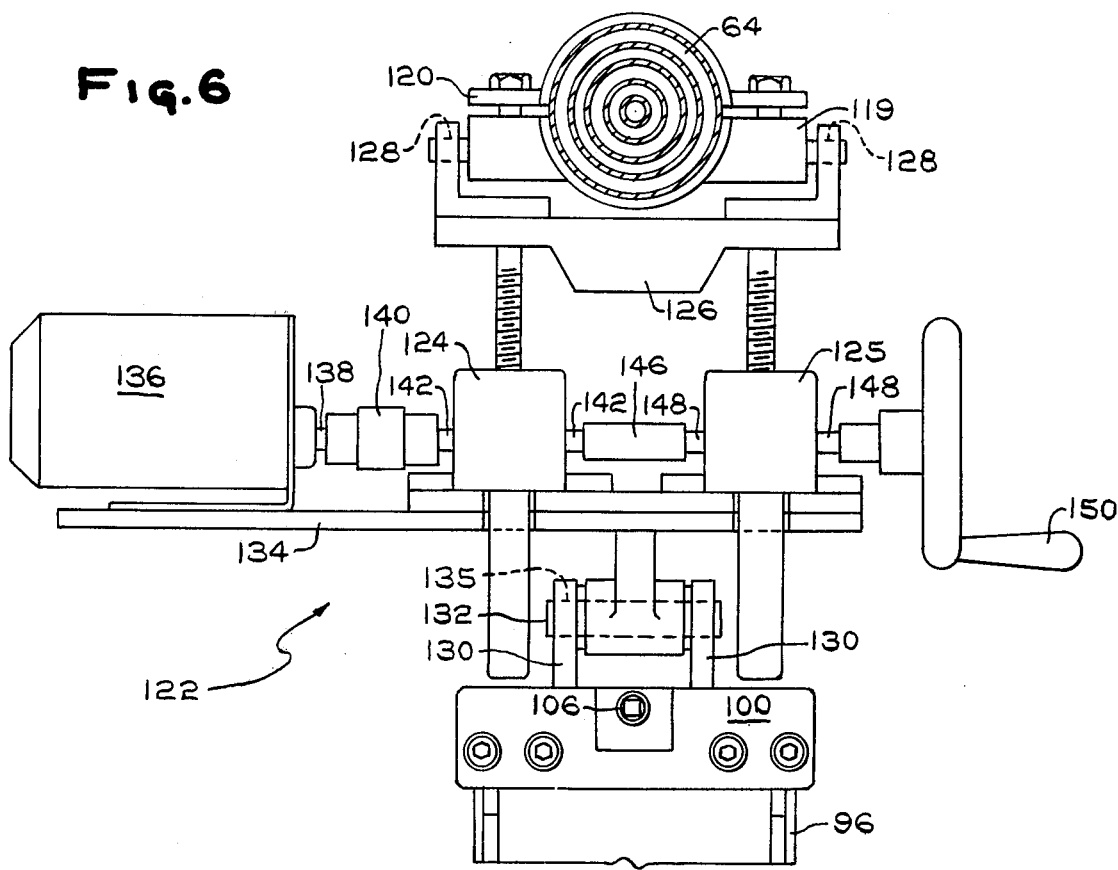
FIG. 6 is an elevated view taken along lines 6—6 of FIG. 3.

Referring to FIGS. 3 and 6, as briefly described hereinbefore, the elevation mechanism 122 is conveniently mounted on base 100 and acts on clampbottom 119 to control vertical arcuate movement of the barrel 64 about the fulcrum point 121, e.g., pin 118 in groove 123. Elevation mechanism 122 includes a pair of matched, vertically disposed screw jacks 124 and 125 preferably symmetrically positioned on opposite sides of the longitudinal centerline of barrel 64 and connected by bracket 126 and bearings 128 to clampbottom 119. Elevation mechanism 122 is pivotally mounted at 135 to brackets 130 of the base 100 by pin 132. A plate 134 structurally supports screw jacks 124 and 125 and a gearmotor 136 relative to one another. Gearmotor 136 is operatively connected to one end of shaft 142 of screw jack 124 by driveshaft 138 acting through coupling 140 with the other end of the shaft 142 operatively connected to one end of shaft 148 of screw jack 125 through coupling 146. The other end of shaft 148 of screw jack 125 is operatively connected to handwheel 150. Energizing the motor 136 or rotating the wheel 150 in a first direction raises the screw jacks 124 and 125 to pivot the barrel about the fulcrum 121 to lower the attenuating wheel, and rotating in a second and opposite direction lowers the screw jacks 124 and 125 to pivot the barrel in an opposite direction to raise the attenuating wheel. As can be appreciated, the elevation mechanism 122 provides a stable, adjustable support for barrel 64, while providing for both manual and motorized control of the vertical arcuate movement of barrel 64 about fulcrum point 121.

Gearmotor 136 is preferably one which can be manually backdriven, rather than one of the self-locking variety. Through this arrangement elevation mechanism 122 is simultaneously controllable either remotely through gearmotor 136 or manually by handwheel 150. Helical or spurgear motors are suitable for this application, it being preferred to use a Bodine Electric Company Model 474 Gearmotor, Induction Type, Frame NCL-1303, 60/1 Ratio, 1/30 H.P., 28 R.P.M. output.

As discussed briefly hereinbefore, the barrel 64 consists principally of a drive tube 160 which is rotatably mounted within an outer jacket 162 as shown in FIG. 7. Drive tube 160 is rigidly connected adjacent its glass engaging end to attenuating wheel 62 and is operatively connected to variable speed motor 63 (see FIG. 2) via gearbelt pulley 164 mounted on its drive end. Inlet pipe 166 is mounted within drive tube 160 to conveniently move cooling fluid through attenuating wheel 62 and drive tube 160 while cooling fluid is also conveniently moved through outer jacket 162.

Drive tube 160 is pivotally mounted near its glass engaging end in a toroidal bushing 168, which is preferably made of a lubricious, heat resistant material such as graphite having its pores impregnated with metal, e.g., babbitt, copper, bronze, etc. Bushings which are self-lubricating and able to withstand temperatures in excess of 200° F. (93° C.) are preferred in the practice of the invention.

Drive tube 160 is pivotally mounted near its drive end within a bearing housing 170 and flange bearing 172. Bearing housing 170 is attached to the drive end of outer jacket 162 and is internally machined in concentric alignment with the toroidal bushing 168. A precision piloted flange bearing 172, e.g., a piloted ball or piloted roller bearing, e.g., of the type sold by the Link Belt Company as FC-B224244 Flanged Cartridge Ball Bearing, is inserted therein for precise alignment between drive tube 160 and toroidal bushing 168.

Precise alignment reduces undue wear of toroidal bushing 168, and eliminates non-uniform rotation of attenuating wheel 62, thus eliminating perturbations in the body of hot glass 44.

The present invention provides for controlled adjustment of the position of the attenuating wheel 62 in all spatial directions. The base 100 provides for the longitudinal motion of the barrel 64 into and out of the float chamber 20, thus providing the capability to engage glass ribbons of different widths.

Rotating the platform 96 about pivot shaft 90 provides horizontal arcuate motion to control the longitudinal and transverse force components exerted by attenuating wheel 62 upon the glass. Having pivot shaft 90 in close proximity to sidewall 24 provides a greater degree of horizontal arcuate movement than was provided by previous devices, for a fixed sidewall opening dimension. Further, securing the support facility 66 directly to sidewall 24 by way of bolts 95 provides a constant reference point for precise angle control and repeatability of operation. Vertical arcuate motion of the barrel 64 is controlled cooperatively by the nip-unnip assembly 116 and the elevation mechanism 122. Nip-unnip assembly 116 provides for emergency lifting of the rotatable wheel 62, while simultaneously providing a fulcrum point 121 for the operation of the elevation mechanism 122. Elevation mechanism 122 establishes a stable support for the drive end of barrel 64 while also providing precise control over the vertical orientation of the barrel 64, in either a manual or motor driven mode. Further, as shown in FIG. 3, raising nip-unnip assembly 116 and lowering elevation mechanism 122 conveniently positions attenuating wheel 62 above the horizontal line of barrel 64 to move it a considerable distance above the surface of the body of hot glass 44, thus permitting access thereunder for manual manipulation of the glass, if such should become necessary during production. Further, by simultaneously activating the gearmotor 136 to lower elevation mechanism 122 and activating nip-unnip assembly 116 to raise fulcrum point 121, optimum emergency disengagement is provided.

Bearing housing 170 and flange bearing 172 assure precise alignment between drive tube 160 and the toroidal bushing 168, thus providing a longer operating life for toroidal bushing 168 and avoiding perturbations of the glass caused by non-uniform rotation of attenuating wheel 62.

The specific embodiments presented herein are not intended to be limiting to scope of the present invention but, rather, attention must be given to the claims which follow.

I claim:

1. An apparatus for attenuating a ribbon of glass which is supported upon a pool of molten metal contained in a chamber, said chamber including refractory sidewalls and a refractory bottom encased within a casing member and supported by structural support members extending below said casing member, at least one of said sidewalls having at least one opening therein above the level of said pool of molten metal to provide access into said chamber for engagement of a marginal edge portion of said ribbon of glass, comprising:
    support means structurally mounted to and supported by said casing member and at least one of said structural support members below the elevation of said at least one opening in such a manner that said support means is isolated from floor vibrations;
    platform means;
    means for pivotally mounting said platform means to said support means to provide substantially horizontal arcuate motion of said platform means;
    an elongated member;
    means mounted to said elongated member for engaging marginal edge portions of said glass ribbon; and
    means for mounting said elongated member on said platform means.

2. The apparatus as set forth in claim 1 wherein said elongated member mounting means comprises:
    means for moving said elongated member longitudinally toward and away from said sidewall opening.

3. The apparatus as set forth in claim 1 or 2 wherein said elongated member mounting means comprises:
    means for controllably translating said elongated member through a substantially vertical arcuate path.

4. The apparatus as set forth in claim 1 wherein said pivotally mounting means comprises:
    means for moving said platform means along a path generally parallel to said sidewall.

5. The apparatus as set forth in claim 4, wherein said support means includes a pair of brace plates rigidly attached to said casing member and at least one of said structural support members.

6. The apparatus as set forth in claim 5 wherein said support means includes a guiderail which extends along a horizontal line substantially parallel to said sidewall; and
   means for securing said guiderail to said pair of brace plates.

7. The apparatus as set forth in claim 6 wherein said means for moving includes a pair of wheels rotatably mounted thereon and mountable on said guiderail.

8. The apparatus as set forth in claim 7 wherein said support means further comprises:
   a substantially horizontal plate secured to said brace plates and generally parallel to said guiderail;
   means for aligning said means for moving in a predetermined location with respect to said substantially horizontal plate; and
   means for securing said means for moving to said substantially horizontal plate in said predetermined location.

9. The apparatus as set forth in claim 8 wherein said aligning means comprises at least one pair of alignable holes in said substantially hoizontal plate and said for moving means; and
   said securing means comprises a nut and bolt assembly.

10. An apparatus for attenuating a ribbon of glass which is supported upon a pool of molten metal contained in a chamber, said chamber including sidewalls having at least one opening therein to provide access into said chamber for engagement of a marginal edge portion of said ribbon of glass; comprising:
    support means mounted to the exterior of at least one of said sidewalls below the elevation of said opening;
    platform means;
    means for pivotally mounting said platform means to said support means to provide substantially horizontal arcuate motion of said platform means;
    an elongated member;
    means mounted to said elongated member for engaging marginal edge portions of said glass ribbon; and
    means for mounting said elongated member on said platform means, wherein said elongated member mounting means comprises:
    means acting on said elongated member to establish a fulcrum point about which said elongated member is substantially rotatable; and
    a pair of operatively connected substantially vertically disposed jack assemblies pivotally connecting said elongated member to said platform means, said jack assemblies positioned on opposite sides of the longitudinal axis of said elongated member to pivot said elongated member in a vertical arcuate path about said fulcrum point.

11. The apparatus as set forth in claim 10 wherein said elongated member mounting means further comprises:
    means for moving said elongated member longitudinally toward and away from said sidewall opening.

12. The apparatus as set forth in claim 10 or 11 wherein said jack assemblies comprise screw jack assemblies.

13. The apparatus as set forth in claim 12 wherein said screw jack assemblies share a common rotatable control shaft, one end of said control shaft acted upon by motor means for changing the elevation of said screw jack assemblies, the opposite end of said control shaft acted upon by means for manually rotating said control shaft for changing the elevation of said screw jack assemblies.

14. The apparatus as set forth in claim 13 wherein said motor means is a manually back-driveable motor to permit adjustment of the position of said elongated member by said manual rotating means.

15. In an apparatus for attenuating a ribbon of glass which is supported upon a pool of molten metal contained within a chamber having sidewalls with at least one opening therein, the opening providing access for engagement of a marginal edge portion of said ribbon of glass to establish and maintain a desired ribbon width and thickness, comprising support means, means for applying force to said glass ribbon, and an elongated member interconnecting said support means and said force means, said elongated member having an inner tubular member rotatably driven within an outer tubular member, the improvement comprising:
    bushing means between said tubular members for supporting said inner tubular member within said outer tubular member near said force means; and
    bearing means secured between said tubular members near said support means for supporting said inner tubular member in coaxial alignment with said bushing means.

16. The apparatus as set forth in claim 15 wherein said bearing means is secured in housing means, said housing means secured to said outer tubular member near said support means and coaxially aligned with said bushing means.

17. The apparatus as set forth in claim 16 further comprising:
    means for passing cooling fluid through said inner tubualar member and said outer tubuiar member.

18. The apparatus as set forth in claim 17 wherein said bearing means comprises a piloted roller bearing.

19. The apparatus as set forth in claim 17 wherein said bearing means comprises a piloted ball bearing.

20. The apparatus as set forth in claim 17 wherein said support means comprises means for mounting said elongated member, and wherein said inner tubular member is supported within said outer tubular member only adjacent said force means and said elongated member mounting means by said bushing means and said bearing means.

21. An apparatus for attenuating a ribbon of glass which is supported upon a pool of molten metal contained in a chamber having sidewalls with at least one opening therein, the opening providing access for engagement of a marginal edge portion of said ribbon of glass to establish and maintain a desired ribbon width and thickness, comprising:
    an elongated member;
    means mounted adjacent a first end of said elongated member and insertable into said chamber for engaging marginal edge portions of said glass ribbon;
    support means outside said chamber;
    means acting adjacent a second and opposite end of said elongated member to secure said elongated member on said support means and provide a fulcrum point about which said elongated member is substantially vertically rotatable; and
    a pair of operatively connected vertically disposed jack assemblies pivotally connecting said elongated member to said support means; said jack assemblies positioned on opposite sides of the longitudinal axis of said elongated member to pivot said elongated member in a vertical arcuate path about said fulcrum point.

22. The apparatus as set forth in claim 21 wherein said jack assemblies comprise screw jack assemblies.

23. The apparatus as set forth in claim 22 wherein said screw jack assemblies share a common rotatable control shaft, one end of said control shaft acted upon by motor means for changing the elevation of said screw jack assemblies, the opposite end of said control shaft acted upon by means for manually rotating said control shaft for changing the elevation of said screw jack assemblies.

24. The apparatus as set forth in claim 23 wherein said motor means is a manually back-driveable motor to permit adjustment of the position of said elongated member by said manual rotating means.

25. The apparatus as set forth in claim 9 or 24 wherein said elongated member comprises an inner tubular member and outer tubular member, said inner tubular member adapted at a first end to support said engaging means and at a second end for rotation within said outer tubular member, said inner tubular member supported within said outer tubular member by a bushing secured between said tubular members near said first end and upon a bearing secured between said tubular member near said second end.

26. The apparatus as set forth in claim 20 or 24, wherein said support means is mounted to the exterior of one of said sidewalls below the elevation of said at least one opening therein.

27. The apparatus as set forth in claim 9 or 20 wherein said elongated member mounting means comprises:
means acting on said elongated member to establish a fulcrum point about which said elongated member is substantially vertically rotatable; and
a pair of operatively connected substantially vertically disposed jack assemblies pivotally connecting said elongated member to said platform means, said jack assemblies positioned on opposite sides of the longitudinal axis of said elongated member to pivot said elongated member in a vertical arcuate path about said fulcrum point.

28. An apparatus for attenuating a ribbon of glass which is supported upon a pool of molten metal contained in a chamber, said chamber including sidewalls having at least one opening therein to provide access into said chamber for engagement of a marginal edge portion of said ribbon of glass; comprising:
support means mounted to the exterior of at least one of said sidewalls below the elevation of said opening;
platform means;
means for pivotally mounting said platform means to said support means to provide substantially horizontal arcuate motion of said platform means;
an elongated member;
means mounted to said elongated member for engaging marginal edge portions of said glass ribbon; and
means for mounting said elongated member on said platform means, wherein said elongated member comprises an inner tubular member and outer tubular member, said inner tubular member adapted at a first end to support said engaging means and at a second end for rotation within said outer tubular member, said inner tubular member supported within said outer tubular member by a bushing secured between said tubular members near said first end and upon a bearing secured between said tubular members near said second end.

29. An apparatus for attenuating a ribbon of glass which is supported upon a pool of molten metal contained in a chamber, said chamber having a floor supported outside its periphery and including a refractory bottom and refractory sidewalls encased within a casing member and supported by structural support members extending below said casing member, at least one of said sidewalls having at least one opening therein above the level of said pool of molten metal to provide access into said chamber for engagement of a marginal edge portion of said ribbon of glass, comprising:
support means mounted to said casing member and at least one of said structural support members below the elevation of said at least one opening;
platform means;
means for pivotally mounting said platform means to provide substantially horizontal arcuate motion of said platform means;
first means for mounting said pivotally mounting means to said support means to maintain said pivotally mounting means spaced from and above said floor;
an elongated member;
means mounted to said elongated member for engaging a marginal edge portion of said glass ribbon; and
second means for mounting said elongated member to said platform means.

* * * * *

UNITED STATES PATENT AND TRADEMARK OFFICE
CERTIFICATE OF CORRECTION

PATENT NO. : 4,300,938

DATED : November 17, 1981

INVENTOR(S) : Earl L. May

It is certified that error appears in the above-identified patent and that said Letters Patent are hereby corrected as shown below:

Column 9, Claim 9, lines 24 and 25, after the term "said", second occurrence, delete the words 'for moving means' and insert therefor --means for moving--.

Column 10, Claim 17, line 35, delete the term "tubualar", first occurrence, and insert the word --tubular--.

Signed and Sealed this

Ninth Day of February 1982

[SEAL]

Attest:

Attesting Officer

GERALD J. MOSSINGHOFF

*Commissioner of Patents and Trademarks*